T. FALKOS.
COASTER BRAKE.
APPLICATION FILED NOV. 15, 1909.

958,796.

Patented May 24, 1910.
2 SHEETS—SHEET 1.

Witnesses:
C. E. Wessels.
B. G. Richards.

Inventor:
Theodore Falkos,
By Joshua R. H. Potts
his Attorney.

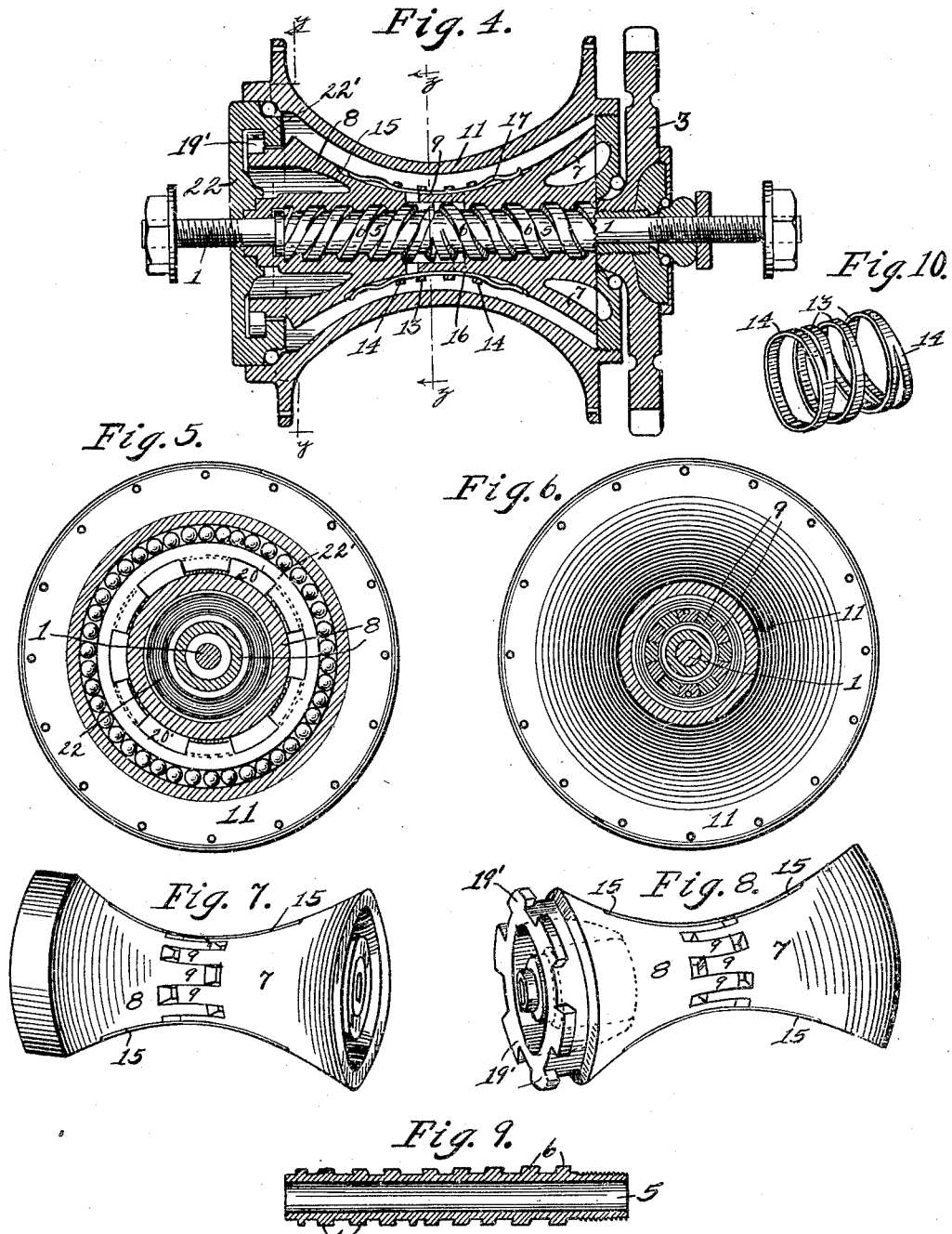

UNITED STATES PATENT OFFICE.

THEODORE FALKOS, OF AURORA, ILLINOIS.

COASTER-BRAKE.

958,796.  Specification of Letters Patent.  Patented May 24, 1910.

Application filed November 15, 1909. Serial No. 528,130.

*To all whom it may concern:*

Be it known that I, THEODORE FALKOS, a citizen of the United States, residing at Aurora, county of Kane, and State of Illinois, have invented certain new and useful Improvements in Coaster-Brakes, of which the following is a specification.

My invention relates to improvements in coaster brakes for bicycles and the like and has for its object the production of a brake of improved construction and efficient in operation.

The invention consists in the combination and arrangement of parts hereinafter described and claimed.

The invention will be best understood by reference to the accompanying drawings forming a part of this specification, and in which—

Figure 1:
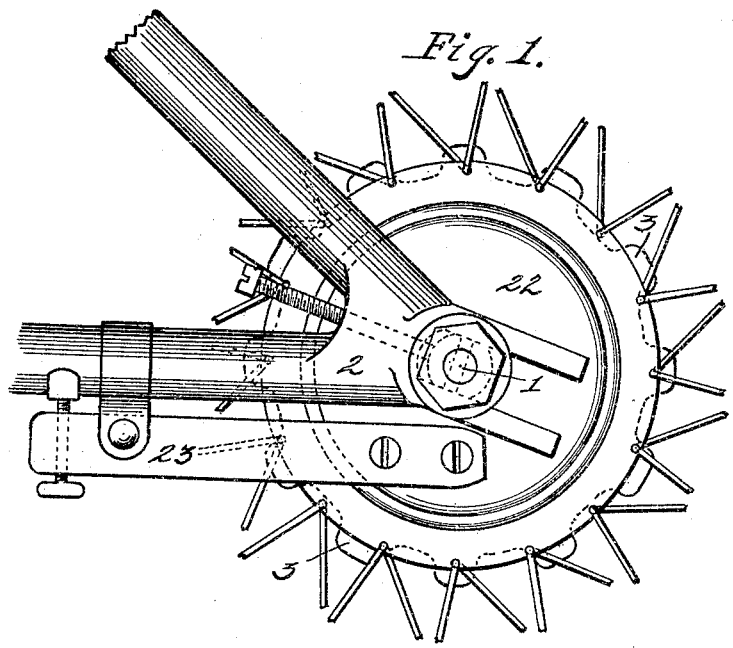
Figure 2:
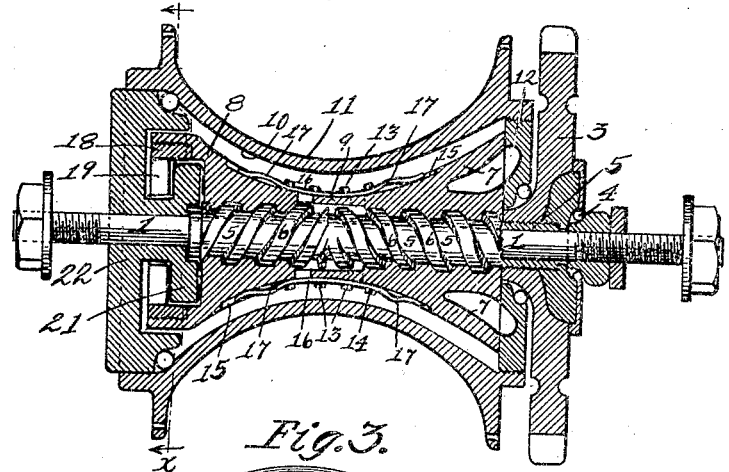
Figure 3:
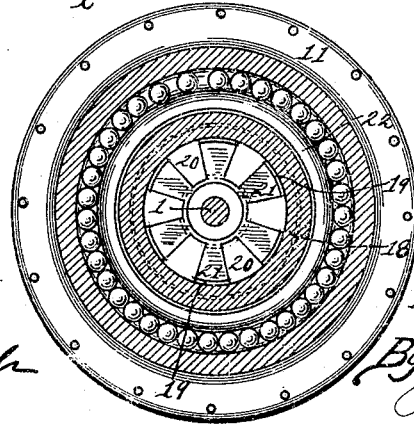

Figure 1 is an elevation of a wheel hub equipped with a coaster brake embodying my invention, Fig. 2, a vertical section of Fig. 1 with certain parts removed and in which the distance between certain parts has been exaggerated for the sake of clearness, Fig. 3, a section on line $x$—$x$ of Fig. 2, Fig. 4, a longitudinal section of a modified form of brake and in which the distance between certain parts has been exaggerated for the sake of clearness, Fig. 5, a section on line $y$—$y$ of Fig. 4, Fig. 6, a section on line $z$—$z$ of Fig. 4, Fig. 7, a perspective view of the friction members employed in the construction illustrated in Figs. 1, 2 and 3, Fig. 8, a perspective view of the friction members illustrated in Figs. 4 and 5, Fig. 9, a longitudinal section of the sleeve for operating the friction members, and Fig. 10, a perspective view of the spring employed for holding the friction members apart.

The preferred form of construction as illustrated in the drawings comprises a rear axle 1 suitably secured in the frame 2 of a bicycle. The driving sprocket 3 of the bicycle is rotatably mounted on axle 1 preferably upon ball bearings 4 and is rigidly connected with a sleeve 5 surrounding axle 1. Sleeve 5 carries oppositely disposed screw threads 6 upon which are threaded oppositely disposed friction members 7 and 8. Friction members 7 and 8 are provided with intermeshing fingers 9 adapted to permit longitudinal movements of said friction members relatively to each other but to compel them to rotate together, thus in effect splining said friction members together. Friction members 7 and 8 are adapted to frictionally engage the inner surface 10 of the wheel hub 11 when forced together, and the outer end of friction member 7 is adapted to engage a plate 12 carried by wheel hub 11 when said friction members are forced apart. A helical spring 13 is mounted upon friction members 7 and 8 and serves to yieldingly hold them apart. This spring is preferably provided with integral bands 14 at either end adapted to engage members 7 and 8. Longitudinal grooves 15 are also provided in friction members 7 and 8 and flat springs 16 having outwardly projecting contact portions 17 are mounted in said grooves and serve to normally press said friction members away from contact with surface 10. At its outer end friction member 8 carries a clutch member 18 having inwardly extending clutch members 19 adapted to engage the corresponding clutches 20 in the clutch member 21 which is carried by a plate 22 upon which hub 11 is rotatably mounted. Plate 22 is connected by means of a clamp 23 with frame 2 so as to normally hold said plate stationary. By this construction it will be seen that upon rotation of sprocket wheel 3 in a forward or clock-hand-wise direction a friction member 7 will be drawn tightly against the plate 12 to cause the hub 11 and consequently the driving wheel of the bicycle to be rotated with said sprocket wheel. When said sprocket wheel is rotated in a reverse direction screw threads 6 then operate to draw friction members 7 and 8 together thus causing engagement between clutch members 19 and 20 to hold said friction members stationary and also applying said friction members to the surface 10 of hub 11 to check the speed of the bicycle wheel. Upon release of the pressure from sprocket wheel 3 springs 13 and 16 operate to force friction members 7 and 8 apart and thus break contact with the hub 11.

In Figs. 4, 5 and 8, I have illustrated a modified form of construction in which the friction member 8 is provided with integral outwardly extending clutch members 19' adapted to engage similar and inwardly projecting clutch members 22' on plate 22, for holding said friction members stationary. The other portions of this construction are the same as those above described.

While I have illustrated and described the preferred form of construction for carrying my invention into effect this is capable of variation or modification without departing from the spirit of the invention. I, therefore, do not wish to be limited to the exact details of construction set forth but desire to avail myself of such variations and modifications as come within the scope of the appended claims.

Having described my invention what I claim as new and desire to secure by Letters Patent is:

1. In a device of the class described, the combination with the frame and hub of a wheel of a bicycle, of a rotatable sleeve in said hub; a sprocket wheel rigidly connected with said sleeve; opposite screw threads on said sleeve; oppositely disposed friction members threaded on said sleeve and connected to rotate together; friction surfaces in said hub adapted to contact with said friction members when they approach each other; a friction surface on said hub adapted to contact with one of said members when they recede from each other; a stationary clutch member carried by said frame; and a clutch member on one of said friction members adapted to engage said stationary clutch member when said friction members are forced together, substantially as described.

2. In a device of the class described, the combination with the frame and hub of a wheel of a bicycle; of a rotatable sleeve in said hub; a sprocket wheel rigidly connected with said sleeve; opposite screw threads on said sleeve; oppositely disposed friction members threaded on said sleeve and connected to rotate together; friction surfaces in said hub adapted to contact with said friction members when they approach each other; a friction surface on said hub adapted to contact with one of said members when they recede from each other; yielding means for forcing said friction members apart; a stationary clutch member carried by said frame; and a clutch member on one of said friction members adapted to engage said stationary clutch member when said friction members are forced together, substantially as described.

3. In a device of the class described, the combination with the frame and hub of a wheel of a bicycle; of a rotatable sleeve in said hub; a sprocket wheel rigidly connected with said sleeve; opposite screw threads on said sleeve; oppositely disposed friction members threaded on said sleeve and splined together; friction surfaces in said hub adapted to contact with said friction members when they approach each other; a friction surface on said hub adapted to contact with one of said members when they recede from each other; a stationary clutch member carried by said frame; and a clutch member on one of said friction members adapted to engage said stationary clutch member when said friction members are forced together, substantially as described.

4. In a device of the class described, the combination with the frame and hub of a wheel of a bicycle; of a rotatable sleeve in said hub; a sprocket wheel rigidly connected with said sleeve; opposite screw threads on said sleeve; oppositely disposed friction members threaded on said sleeve and splined together; friction surfaces in said hub adapted to contact with said friction members when they approach each other; a friction surface on said hub adapted to contact with one of said members when they recede from each other; yielding means for forcing said friction members apart; a stationary clutch member carried by said frame; and a clutch member on one of said friction members adapted to engage said stationary clutch member when said friction members are forced together, substantially as described.

In testimony whereof I have signed my name to this specification in the presence of two subscribing witnesses.

THEODORE FALKOS.

Witnesses:
G. D. CHIOLE,
EDWARD O. PETERSEN.